United States Patent [19]

Miller et al.

[11] Patent Number: 5,287,518

[45] Date of Patent: Feb. 15, 1994

[54] ENGINE CRANKSHAFT VARIABLE RELUCTANCE ALTERNATOR

[75] Inventors: John M. Miller, Saline; Roy E. Diehl, Northville, both of Mich.

[73] Assignee: Ford Motor Company, Dearborn, Mich.

[21] Appl. No.: 897,636

[22] Filed: Jun. 12, 1992

[51] Int. Cl.$^5$ .................................................. H02J 7/00
[52] U.S. Cl. .................................................. 320/61; 322/90
[58] Field of Search .................. 320/60, 61, 62, 64, 320/68; 310/168; 322/90

[56] References Cited

U.S. PATENT DOCUMENTS

| 3,652,883 | 3/1972 | Cone | 310/74 |
| 3,747,649 | 7/1973 | Densow et al. | 30/381 |
| 4,281,279 | 7/1981 | Gurwicz | 320/59 X |
| 4,387,781 | 6/1983 | Ezell et al. | 320/61 X |
| 4,404,513 | 9/1983 | Campen | 322/90 |
| 4,417,195 | 11/1983 | MacLeod | 320/61 X |
| 4,455,492 | 6/1984 | Guelpa | 320/61 X |
| 4,709,669 | 12/1987 | Wissmann et al. | 123/149 |
| 4,825,139 | 4/1989 | Hamelin et al. | 320/61 X |

Primary Examiner—Kristine L. Peckman
Attorney, Agent, or Firm—Roger L. May; Paul K. Godwin, Jr.

[57] ABSTRACT

Method and apparatus are provided, for use in a vehicle having an internal combustion engine (10) and a battery (38), for converting mechanical energy into electrical energy for charging the battery, the apparatus being disposed within the engine crankcase (22). The apparatus includes a stator (14), disposed within the engine crankcase (22), having a plurality of teeth (34). Each tooth on the stator has a coil (36) wound thereabout electrically connected to the battery (38). The apparatus also includes a crankshaft (12) disposed within the engine crankcase (22) for rotation relative to the stator (14). The crankshaft (12) includes a plurality of lobes ($30_{1-4}$), which periodically move into close proximity with the stator teeth (34) upon rotation of the crankshaft, thereby inducing a current in the coils (36) for charging the battery (38).

25 Claims, 6 Drawing Sheets

ENGINE CRANKSHAFT VARIABLE RELUCTANCE ALTERNATOR

TECHNICAL FIELD

The present invention relates to a method and apparatus for converting mechanical energy into electrical energy to perform the alternator function in a vehicle having an internal combustion engine.

BACKGROUND ART

Vehicles having internal combustion engines typically include an alternator which converts the mechanical energy of the engine into electrical energy for charging the vehicle battery and providing electrical power to the various power-consuming devices, such as air conditioning compressors, power window motors, and the like. An alternator is ordinarily belt driven and, as a result, occupies valuable engine compartment space and requires periodic maintenance.

U.S. Pat. No. 3,747,649, issued to Denso et al., discloses a crankshaft magneto system for use with a chain saw having a breakerless ignition system. The breakerless ignition system is removed from association with a flywheel and is provided on a crank cheek of the engine crankshaft. The crank cheek is generally constructed of a non-permeable material, such as aluminum, and includes a yoke or a member formed of a permeable material, such as soft iron, having two pole pieces spaced angularly with respect to the crankshaft axis. The permeable yoke rotates past a stationary magnet structure positioned outside of and supported by the crankcase. Spaced legs cooperate with the pole pieces to periodically complete and interrupt magnetic circuits as the crank cheek rotates relative to the stationary legs. A flux path from the magnet structure through the yoke is established and then discontinued as the yoke travels past the magnet structure upon every rotation of the crankshaft.

U.S. Pat. No. 4,709,669, issued to Wissmann et al., discloses an ignition arrangement for an internal combustion engine of a hand-held power tool. The ignition arrangement includes spark generating means which permits the electrical energy generated in an excitor coil to be stored and supplied to the ignition coil at the instant of ignition. A high-voltage pulse is generated in the ignition coil which causes the igniting spark of the spark plug. The ignition arrangement also includes a permanent magnet having at least one pole shoe operatively connected to the igniting spark generating means, the ignition coil being mounted on the permanent magnet or its pole shoe.

Many prior art devices require the use of a permanent magnet. Permanent magnets, however, are temperature sensitive and therefore not well suited for applications within the engine crankcase. It is therefore desirable to provide an apparatus for performing the alternator function for use with an internal combustion engine which eliminates the aforementioned problems.

SUMMARY OF THE INVENTION

It is therefore an object of the present invention to provide an apparatus, disposed within the crankcase of the engine, for performing the alternator function.

In carrying out the above object and other objects and features of the present invention, there is provided, for use in a vehicle having an internal combustion engine and a battery, an apparatus for converting mechanical energy into electrical energy for charging the battery. The apparatus includes a stator disposed within the engine crankcase and having at least one tooth. The tooth preferably has a coil wound thereabout electrically connected to the battery. The apparatus also includes a rotor disposed within the engine crankcase for rotation relative to the stator. The rotor includes at least one lobe which becomes proximate to the at least one stator tooth upon rotation of the rotor, to induce a current in the at least one coil for charging the battery. In its preferred construction, the rotor is a crankshaft, such that the battery is charged during each crankshaft rotation.

In further carrying out the above object and other objects and features of the present invention, a method of converting mechanical energy into electrical energy is provided.

The advantages accruing in the present invention are numerous. For example, since the alternator function is performed entirely within the engine crankcase, a belt-driven alternator is no longer required, thereby eliminating the maintenance problems associated with belt-driven alternators and minimizing engine accessory belt loads.

The above object and other objects and features of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
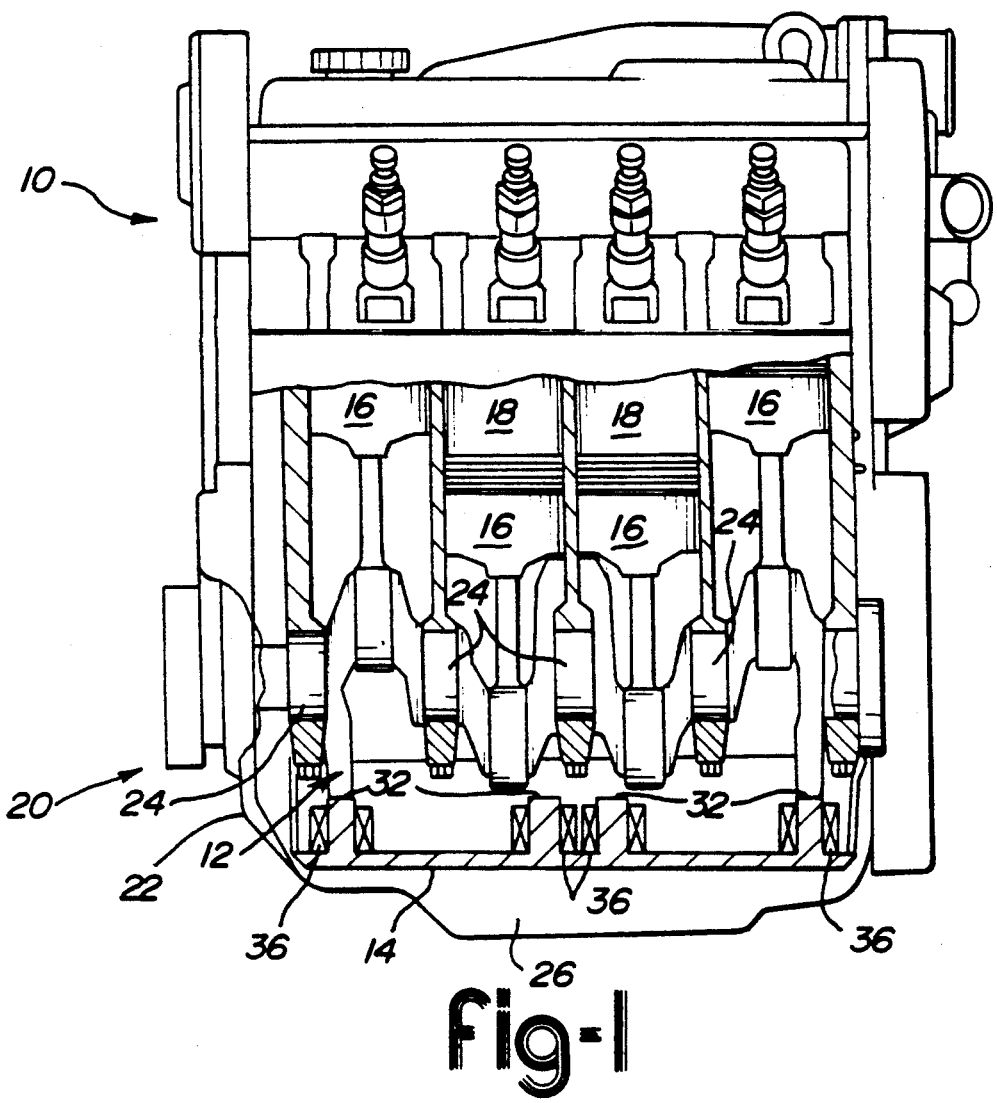
FIG. 1 is a partial cross-sectional view of an internal combustion engine which includes the engine crankshaft variable reluctance alternator of the present invention.

Referring now to FIG. 1, there is illustrated a cross-sectional view of an internal combustion engine shown generally by reference numeral 10. As illustrated, the engine 10 includes a crankshaft, or rotor, 12 and a stator 14. In the preferred embodiment, the crankshaft 12 rotates about an axis A, imparting translational motion to a plurality of pistons 16, which reciprocate in an equal number of cylinders 18 during the combustion process. As best shown in FIG. 1, the stator 14 is disposed entirely within the engine crankcase 22 and is preferably constructed of generator-grade iron, such as that typically utilized in alternators. Most preferably, the stator 14 is fixedly attached to journal bearing 24 such that the stator is positioned within the oil pan 26 and submerged in or splashed by the engine oil therewithin.

Figure 2:
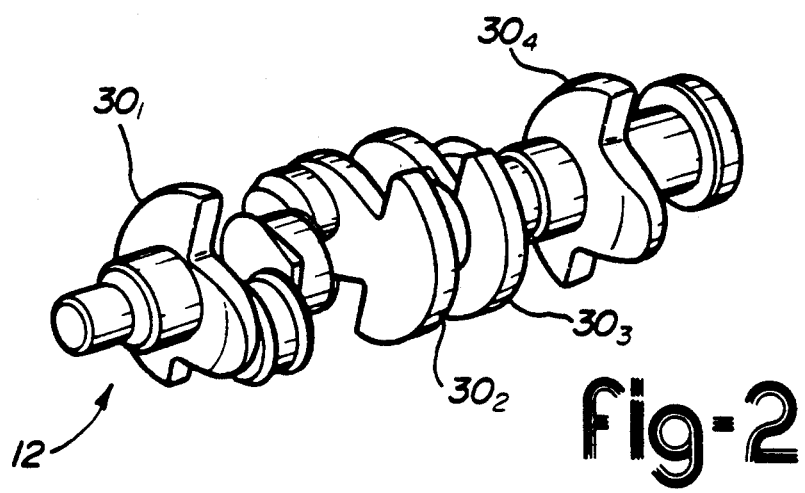
FIG. 2 is a perspective view of the crankshaft of the internal combustion engine shown in FIG. 1.

Referring now to FIGS. 1 and 2, the crankshaft 12 preferably includes a plurality of lobes $30_1$ through $30_4$ and the stator 14 includes a similar number of branches 32. Preferably, each branch 32 includes a plurality of stator teeth 34 and each tooth 34 has a winding wound thereabout to form a like plurality of coils 36 which are electrically connected to a battery 38 (shown in FIG. 4). As shown, the crankshaft 12 is constructed such that as the crankshaft rotates, crankshaft lobes $30_1$ and $30_4$ simultaneously encounter associated stator branches 32. Similarly, crankshaft lobes $30_2$ and $30_3$ simultaneously encounter associated stator branches 32. It should be appreciated, however, that the crankshaft 12 could be constructed with many different lobe geometries. It should also be appreciated that this construction results in the crankshaft lobes $30_{1-4}$ passing the associated stator branches 32 in a radial face-to-face relationship, rather than passing side-by-side in an axial relationship.

Figure 3:
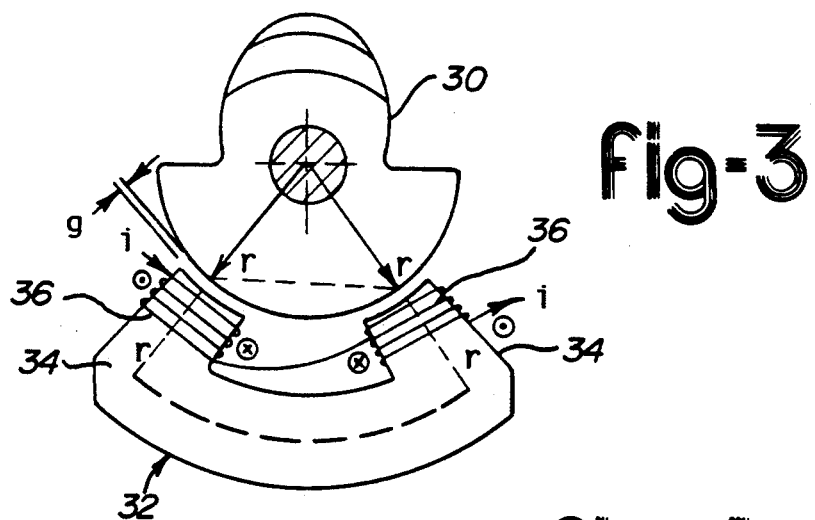
FIG. 3 is a side view of an individual crankshaft lobe in substantially complete alignment with an associated stator branch.

Referring now to FIG. 3, there is shown an individual crankshaft lobe 30 in substantially complete alignment with a stator branch 32. As shown, the crankshaft lobe has an effective arc length of approximately 180°. With an arc length of 180° and the crankshaft lobe pairing shown in FIG. 2, there is generally continuous alignment of two crankshaft lobes with associated stator branches. As the crankshaft 12 rotates within the crankcase 22, each lobe 30 moves into close proximity with the stator teeth 34 of an associated branch 32, inducing a current in the coils 36 to charge the battery 38, as described in greater detail hereinbelow.

Figure 4:
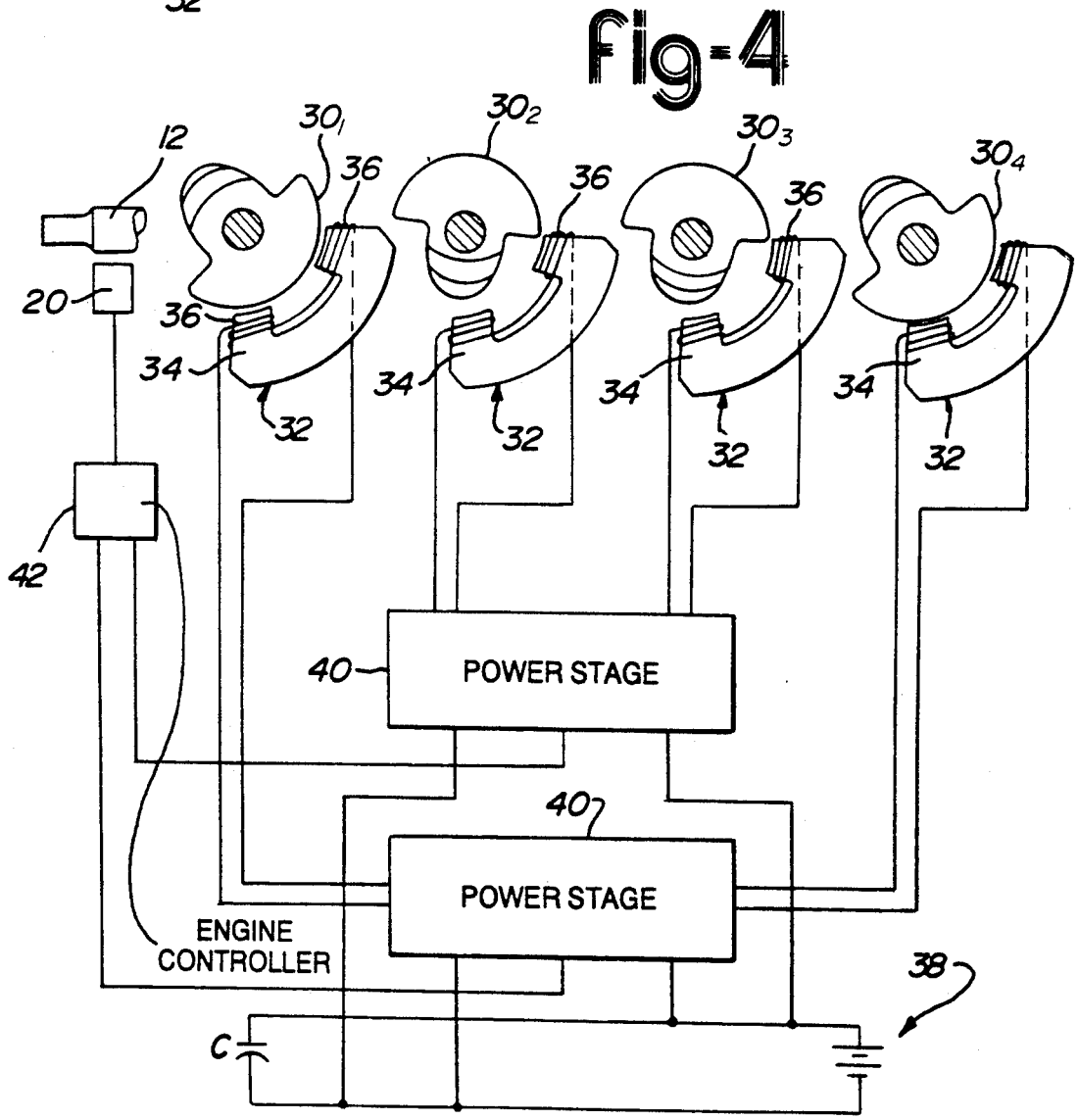
FIG. 4 is a block diagram illustrating the electrical connections for the individual power stages of the engine crankshaft variable reluctance alternator shown in FIG. 1.

Referring now to FIG. 4, there is shown a block diagram illustrating the preferred electrical connections between the coils 36 (i.e. L1 and L2) and the battery 38. As illustrated, coils 36 are connected to a pair of power stages 40. Power stages 40 are in electrical communication with the engine controller 42 and the battery 38. Preferably, the crankshaft sensor 20 provides an electrical signal to the controller 42 indicative of the crankshaft position. Controller 42 controls operation of the power stages 40 to charge the battery 38, as described in greater detail below.

Figure 5:
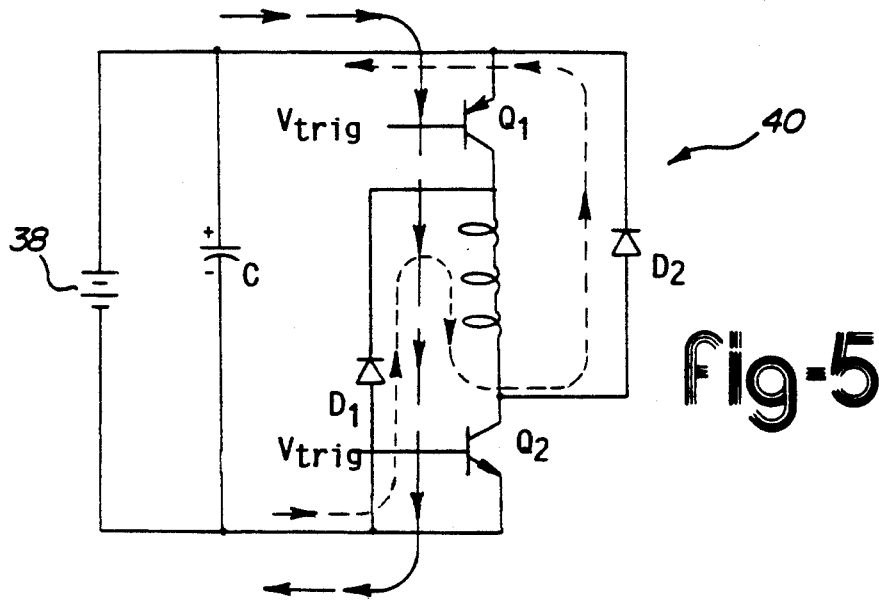
FIG. 5 is a schematic representation of a power stage shown in FIG. 4.

Turning now to FIG. 5, a detailed schematic representation of one of the power stages 40 is presented. Preferably, each power stage 40 includes a pair of transistors Q1 and Q2 and a pair of diodes D1 and D2 electrically connected to the battery 38. The transistors and diodes are electrically arranged to first provide current to the coils C1-L2 as a crankshaft lobe 30 approaches a stator branch 32 and then return current to the battery 38 as the crankshaft lobe 30 rotates past and away from the stator branch. A capacitor (C) is preferably connected across the voltage bus to filter the current pulses and smooth the current returned to the battery 38.

Figure 6A:
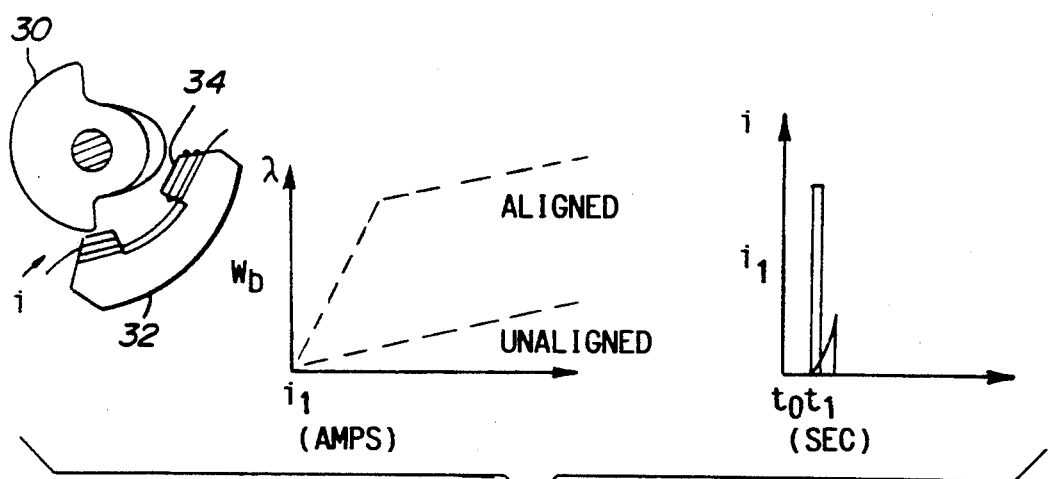
FIG. 6a–6c are a time lapse representation of rotation of a crankshaft lobe past an associated stator branch, including graphical representations of the associated energy and current-time diagrams resulting from the flow of current through the power stage.
Figure 6B:
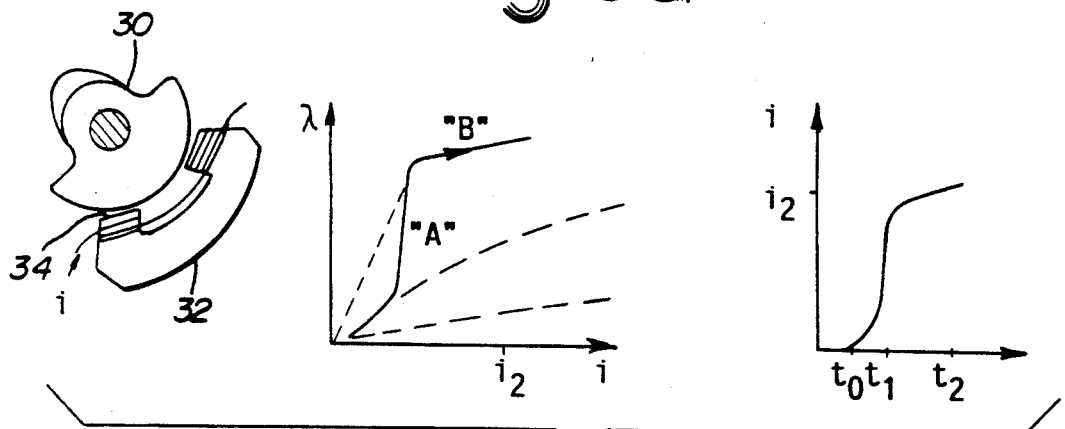
Figure 6C:
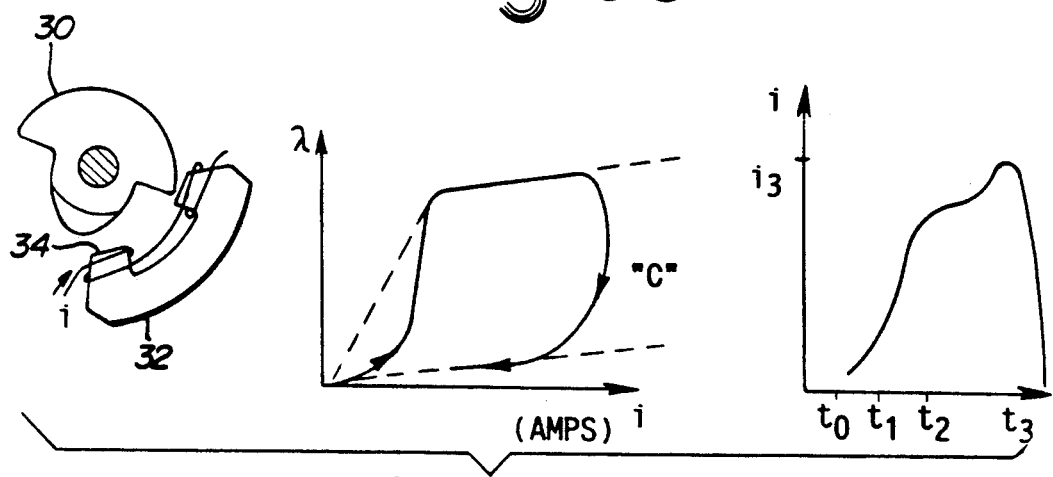

Referring now to FIGS. 6a–6c, a time lapse illustration of the rotation of a crankshaft lobe 30 past a stator branch 32 is provided, in conjunction with graphical representation of the associated energy and current-time diagrams resulting from the flow of current through the power stage 40. The energy diagram graphically illustrates the relationship between the flux linkage, measured in Webers (Wb), versus the current, measured in amps (A), in the coils L1 and L2 as the crankshaft lobe 30 rotates past the stator branch 32. The current-time diagram graphically illustrates the current in the coils over time as the crankshaft lobe 30 rotates past the stator branch 32.

As best known in FIG. 6a, initially the crankshaft lobe 30 is substantially unaligned with, and just beginning to encounter, a tooth 34 of a stator branch 32. At this point (about time T1 on the current-time diagram), the controller 42 receives a position signal from the crankshaft sensor 20 and provides a voltage signal ($V_{trig}$) to the base of Q1 and Q2, biasing the transistors into a state of conductance. This allows a magnetizing current (i) to be provided to the coils L1 and L2 under a condition of fairly low inductance. This current is shown by the solid line in FIG. 5. As the current is driven into the coils, the magnetic flux that is created "links" through the coils and the crankshaft lobe 30 and the power stage 40 is operating in a "magnetizing mode." As previously discussed, the crankshaft 12 and stator 14 are preferably located entirely within the crankcase 22. Since permanent magnets are highly temperature sensitive, their use is not practical in the high temperature engine environment. In the magnetizing mode, however, current is supplied to the coils L1 and L2 which surround the stator teeth, magnetizing the stator teeth 34.

As the crankshaft rotates to the position shown generally in FIG. 6b, the lobe 30 moves to a position of substantially complete alignment with the whole stator branch 32 (about time T2 on the current-time diagram). thus, during the time interval from T0 to T2, energy is delivered to the magnetic field by the battery. In the preferred embodiment, the pitch of the crank lobe 30 an the pitch of the stator branch 32 are set so that there is substantially complete coverage of the stator teeth 34 (i.e. the three salient points), resulting in a state of maximum inductance.

With continuing reference to FIG. 6b, as the torque supplied by the engine continues to move the crank lobe 30 from a position of complete alignment with the stator teeth 34 and coils L1 and L2 inductance decreases from the maximum value associated with complete alignment. At this point, the controller 42 preferably biases Q1 and Q2 into a state of nonconductance, switching off the flow of current from the battery 38. As the crank lobe 30 rotates away from complete alignment, the current quickly generates, or builds-up, to a higher value determined by the crank angle associated with maximum inductance (complete alignment) to the angle associated with a minimum inductance, as indicated by reference point "A" shown in the energy diagram of FIG. 6b. The current in the coils L1 and L2 increases rapidly until the stator teeth 34 become saturated and current flow becomes self-limiting as shown in by the substantially flat curve indicated by reference point "B" shown in the energy diagram of FIG. 6b.

Referring now to FIG. 6c, after further rotation of the crankshaft the crank lobe 30 is shown in substantial unalignment with the stator branch 32 and the coils L1 and L2. Since the transistors Q1 and Q2 are still nonconducting, the power stage 40 remains operating in the "generating mode," generating current back into the battery 38 through diodes D1 and D2 as shown by the dotted line in FIG. 5. As the crankshaft lobe 30 leaves the stator branch 32, the inductance reduces to a minimum value. A pulse of current leaves the coils as the current collapses (about time T3 on the current-time diagram) which is indicated by reference point "C" in the energy diagram of FIG. 6c. As a result of the present invention's implementation of the crankshaft lobe geometry, there are a plurality of discrete battery charging pulses for each crankshaft rotation.

Referring once again to FIG. 5, it should be appreciated that the transistors Q1 and Q2 may be switched on and off independently of each other. For example, transistor Q1 may function as a gate, being switched on and off as the lobes $30_1$ and $30_4$ encounters a stator branch. With additional reference to FIG. 4, it can be seen that the controller 42 "knows" when to switch transistor Q1 on, since the controller receives crankshaft position information from the crankshaft position sensor 20. At higher speeds of crankshaft rotation, the controller 42 can switch transistor Q1 on sooner to ensure the lobe does not pass the stator branch before the proper magnetizing current is in the coils L1 and L2. With transistor Q1 being operated as a gate, the controller 42 can operate transistor Q2 to control the magnitude of the coil current. For example, transistor Q2 can be pulse-width modulated (i.e. switched on and off) to control the generation level of the current through the coils and the diodes back into the battery 38.

Figure 7:
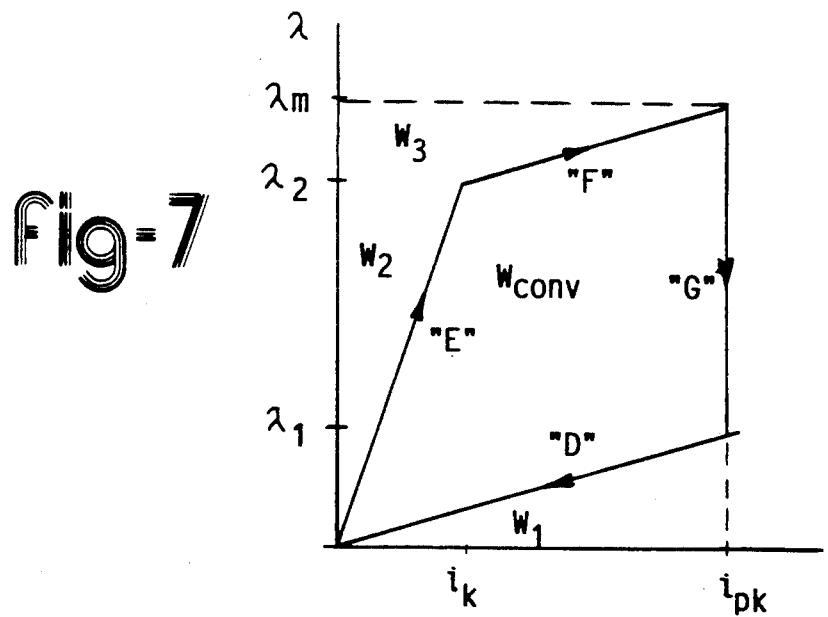
FIG. 7 is a graphical representation of a piecewise linear representation of the energy conversion associated with the alternator of the present invention.

Referring now to FIG. 7, a graphical representation of the energy conversion process associated with operation of the present invention is illustrated. Energy conversion is represented as flux linkage ($\lambda$) plotted against coil current (i). Flux linkage, as previously described, is the flux that "links" the coils with a crankshaft lobe and is a function of the current and the crankshaft angle.

When a crankshaft lobe 30 and an associated stator branch 32 are unaligned, the coils are in a state of low inductance and low permeance (i.e. high reluctance). This state of low inductance results from a relatively long magnetic path (through the air) since the crank lobe is not close to the coils, resulting in the generally shallow-sloped section of the energy conversion curve shown by reference letter "D" on FIG. 7. As the crankshaft lobe encounters a stator branch, the lobe and the branch are separated by only the air gap (shown as "g" in FIG. 3), which preferably ranges from about 5 mils (0.005) to about 20 mils (0.002). Most preferably, the air gap has value of approximately 15 mils (0.015).

The inductance and the permeance increase sharply as a function of the angle between the stator winding and the centerline of the lobe as the crankshaft lobe and the stator branch come into alignment. This state of alignment results in the generally steep-sloped section of the energy conversion curve shown by reference letter "E" on FIG. 7. At this point, the magnetic path is predominantly iron, since the crankshaft lobe and the stator branch are separated only by the air gap. Only the outermost portions of the crank lobe require any iron lamination, since flux is only required to transverse the crank lobe face between stator teeth.

Due to the tight manufacturing tolerance of the engine componentry, the air gap is minimized, maximizing the capacity of the alternator of the present invention. The use of a small air gap is also possible since the crankshaft lobes rotate past the associated stator branches in a face-to-face relationship. If the crankshaft lobes passed the stator branches side-by-side, a larger air gap would be required due to displacement of the crankshaft along the axis "A" (shown in FIG. 1) during engine operation.

With continued reference to FIG. 7, the flux linkage indicated by $\lambda_1$ corresponds to the "magnetizing mode" of operation previously discussed, wherein the controller directs current into the coils to magnetize the stator teeth. Then, as the crank lobe rotates into alignment, current is generated until the point at which the stator teeth become saturated and the inductance is reduced, resulting in a flux linkage indicated generally by $\lambda_2$. Energy generation continues to increase until the current in the coils and the flux linkage attain maximum values (shown generally by $i_{pk}$ and $\lambda_m$, respectively) along the curve shown by reference letter "F". As the crank lobe rotates away from the stator teeth, the current in the coils and the flux linkage collapse, resulting in the generally vertical section of the energy conversion curve shown by reference letter "G". Thus, the energy converted (i.e. the energy available for charging the battery) is represented by the area labeled $W_{conv}$ in FIG. 7. Preferably, $W_{conv}$ is calculated as follows:

$$W_{conv} = \lambda_m i_{pk} - (W_1 + W_2 + W_3)$$

where:

$$W_1 = \frac{1}{2} \lambda_1 i_{pk} \tag{2}$$

$$W_2 = \frac{1}{2} \lambda_2 i_k \tag{3}$$

and $$W_3 = \frac{1}{2} [(\lambda_m - \lambda_2) i_{pk} + (\lambda_m - \lambda_2) i_k] \tag{4}$$

The value of $W_{conv}$, however, does not represent all of the energy supplied to the coils. $W_1$ represents the lost to leakage fields. The energies given by $W_2$ and $W_3$ represent reactive voltamperes exchanged with the capacitor C and batter 38 that are needed to magnetize the stator iron and air gap. The lost energy is generally represented by the area outside of the $W_{conv}$ curve but inside the envelop defined by $\lambda_m$ and $i_{pk}$.

Referring once again to FIG. 3, for a crankshaft lobe 30 having a radius indicated generally by 'r', the mean magnetic path ($l_{eff}$), shown in FIG. 3 as a dotted line, is determined as follows:

$$l_{eff} = \sqrt{3}\, r + 4r + \frac{4\pi}{3} r \tag{5}$$

Thus, $$l_e \approx 10r \tag{6}$$

To determine the air gap flux density associated with one stator tooth, Ampere's Law can be utilized:

$$t \oint \vec{H} \times \vec{dl} = \mathfrak{I}(mmf) = Ni \quad (7)$$

wherein "t" is approximately 5r (half the mean magnetic path), "N" represents the number of turns in the winding or coil an "i" represents the current in the coil. From this, the air gap flux density, $B_{gap}$, can be obtained utilizing the following equation:

$$B_{gap} = \frac{\mu_o Ni}{g + l_p/\mu_r} \quad (8)$$

wherein "$u_o$" represents the permeability of the air gap, g represents the length of the air gap (i.e. approximately 15 mils), "$l_p$" represent the path length, which has a value of approximately 5r and "$\mu_r$" represents the relative permeability of crank lobe and stator steel.

Next, the pole flux, $\phi_p$, can be determined as follows:

$$\phi_p = \frac{\mu_o \alpha_s w Ni}{g/r + 5/\mu_r} \quad (9)$$

wherein "$\alpha_s$" represents the arc occupied by a stator tooth and "w" represents the width of the crankshaft lobe (when viewed as shown in FIG. 1). It should be appreciated that for the stator branch shown in FIG. 3, $\alpha_s$ has a value of approximately $\pi/3$, although it is largely governed by engine design.

Having determined the air gap flux density, next the energy generated per crankshaft lobe ($W_m$) at maximum overlap can be determined as follows:

$$W_m = \frac{1}{2} BHV = \frac{1}{2} B_g\{H_g V_g + H_i V_i\} = \frac{1}{2}\left(\frac{L_{max}}{2}\right) i^2 \quad (10)$$

Since $$W_m = \frac{1}{2} B_g [H_g(gw\alpha_s r) + H_i(l_p \alpha_s rw)] \text{ and} \quad (11)$$

$$gH_g + l_p H_i = Ni \quad (12)$$

by substituting in for $l_p$ and $B_{gap}$, as previously determined in Equation (8), the energy per crankshaft lobe at maximum overlap can be expressed as:

$$W_m = \frac{1}{2}\left[\frac{\mu_o Ni}{(g + l_p/\mu_r)}\right] Ni\alpha_s rw$$

$$= \frac{1}{2}\left[\frac{\mu_o N^2 \alpha_s w}{(g/r + 5/\mu_r)}\right] i^2 \quad (13)$$

with the quantity in the brackets [ ] representing $L_{max}/2$.

Figure 8:
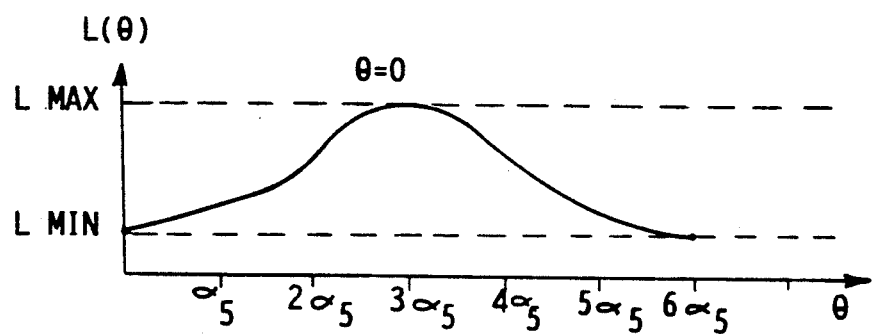
FIG. 8 is a graphical representation of the inductance (L) as a function of crank angle ($\theta$)

Referring now to FIG. 8, there is illustrated a graphical representation of the inductance (L) as a function of crank angle ($\theta$). Crank rotation, in terms of stator arc $\alpha_s$, is plotted along the horizontal axis, wherein $3\alpha_s$ represents one full crank rotation. Since the graph shown in FIG. 8 is similar to the $\cos^2(\theta)$ function, the inductance (L) can be expressed as follows:

$$L(\theta) = (L_{max} - L_{min})\cos^2\theta \quad (14)$$

Accordingly, torque (T) can be expressed as follows:

$$T = \frac{1}{2}(i^2)\frac{dL(\theta)}{d\theta} \quad (15)$$

With $$L_{min} \sim \frac{L_{max}}{5} \quad (16)$$

then $$L(\theta) = \frac{4}{5} L_{max}\cos^2\theta \quad (17)$$

and $$\frac{dL(\theta)}{d\theta} = \frac{8}{5} L_{max}\cos(\theta) \quad (18)$$

At $\theta=0$ (i.e. maximum inductance on FIG. 7), $\cos(\theta)=1$ and Equation (15) can be rewritten as follows:

$$T = \frac{1}{2} i^2 \left(\frac{8}{5}\right) \left(\frac{2\mu_o N^2 \alpha_s w}{(g/r - 5/\mu_r)}\right) = \frac{8\mu_o N^2 \alpha_s w i^2}{5(g/r + 5/\mu_r)} \quad (19)$$

The efficiency of the energy generation can be determined utilizing the following equation:

$$\eta = \frac{1}{1 + \frac{i^2 R}{\omega_r T}} \quad (20)$$

where R is winding resistance and T represents the torque. Substituting equation (15) from above for torque, the equation can be rewritten as follows:

$$\eta = \frac{1}{1 + \frac{2R}{w_r \frac{dL(\theta)}{d\theta}}} \quad (21)$$

Thus, for the best efficiency, it is desirable to have a relatively large change of inductance over crank rotation.

As an example, consider an efficiency calculation utilizing a coil having N=32 turns of 10 AWG wire with the engine operating at a relatively fast idle (e.g. $\omega$=1750 rpm=183 rad/S). Assuming $$\frac{dL(\theta)}{d\theta} = 2L_{max} \quad (22)$$

with $L_{max}$ as shown in equation (13), then $$\eta = \frac{1}{1 + \frac{.117}{183 \cdot 32^2 \cdot 5.165 \times 10^{-6}}} \quad (23)$$

wherein R=0.117Ω, $\mu_o$=12.56=$10^{-7}$, w=20 mm, $\mu_r$=1240 for M36 steel, g=0.4 mm and r=65 mm. This yields an efficiency of:

$$\eta \approx 89\% \quad (24)$$

Since efficiencies usually peak at about 1750 RPM, this represents a good efficiency. Typically, an output of about 50% is expected at lower idle speeds. For an in-line four cylinder engine operating at idle, it is desirable to generate about 250 W of power for each crankshaft lobe. This translates into about 500 W of power total for a full rotation of the crankshaft shown in FIG. 2, or about 1 kW generated for each full rotation of the crankshaft shown in FIG. 9.

Figure 9:
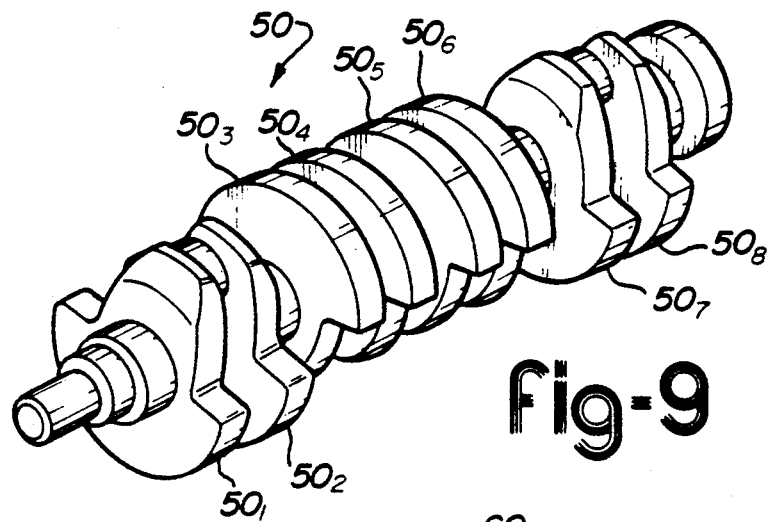
FIG. 9 is a perspective view of a second crankshaft embodiment for use with the present invention.

Referring now to FIG. 9, a second crankshaft embodiment is illustrated and is referred to generally by reference numeral 50. In this preferred embodiment, the crankshaft 50 rotates about an axis "A", and includes a plurality of lobes $50_1$–$50_8$ each having a effective arc length of approximately 180°. As illustrated, the eight individual lobes are generally arranged on the crankshaft 50 in four pairs (i.e. $50_{1-2}$, $50_{3-4}$, $50_{5-6}$ and $50_{7-8}$). Preferably, the crankshaft 50 is constructed such that the crank lobes pairs $50_{1-2}$ and $50_{7-8}$ each simultaneously encounter an associated stator branch and crank lobe pairs $50_{3-4}$ and $50_{5-6}$ each simultaneously encounter an associated stator branch. Since each lobe has an arc length of approximately 180°, this construction results in generally continuous alignment with the stator and, therefore, generally continuous charging of the battery. As in the prior embodiment, the crankshaft lobes $50_1$–$50_8$ pass the associated stator branches in a face-to-face relationship, rather than passing side-by-side.

With continuing reference to FIG. 9, although crankshaft 50 is illustrated with four lobe pairs with each individual lobe having a 180° arc, the crankshaft could be constructed with many different lobe geometries. Furthermore, although the crankshaft 50 shown is for use preferably with an in-line four or V6 engine, similar crankshafts could be utilized for in-line five or V8 engines. For example, a crankshaft for use with an in-line five cylinder engine would preferably have 10 individual lobes forming 5 lobe pairs.

As the crankshaft 50 rotates within the engine crankcase, each lobe pair moves into close proximity with the stator teeth of an associated branch, inducing a current in the coils wound about the teeth to charge the battery. Thus, each rotation of the crankshaft 50 results in eight lobes passing by the stator, resulting in approximately twice the charging output associated with the crankshaft 12 shown in FIG. 2 (i.e. about 2 kW generated for each full rotation of the crankshaft).

Figure 10:
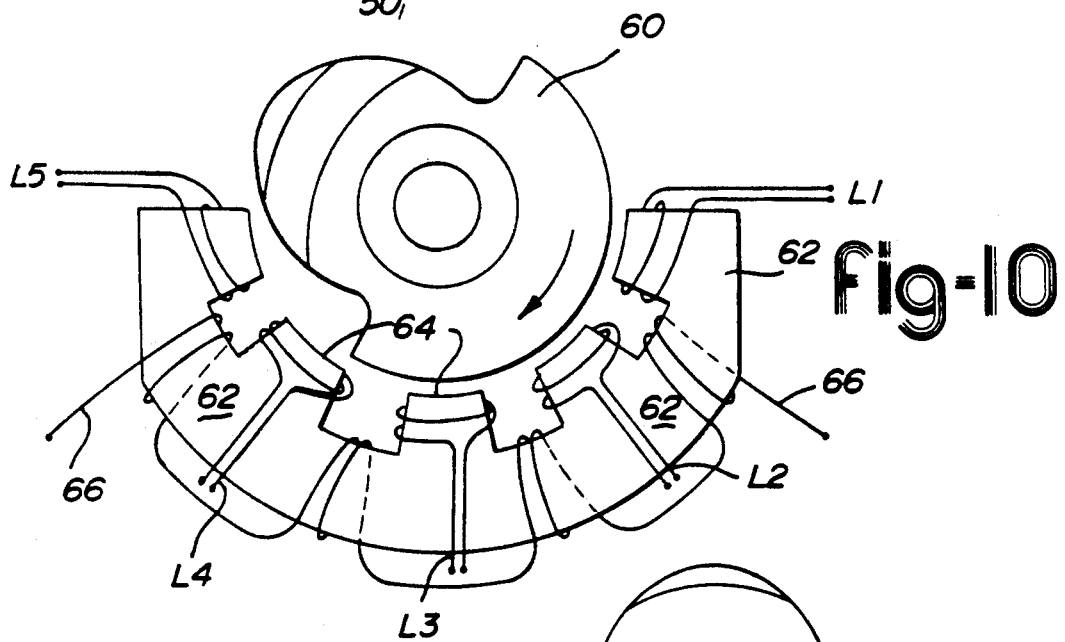
FIG. 10 is a side view of an individual crankshaft lobe and an associated stator branch for a third embodiment of the present invention.

Referring now to FIG. 10, there is shown another embodiment of the present invention. In this preferred embodiment, a crank lobe 60 rotates past a stator branch 62 as the crankshaft rotates. As illustrated, the crank lobe 60 has an effective arc of approximately 180° and the stator branch 62 includes a plurality of stator teeth 64. In this homopolar embodiment, the stator branch 62 preferably includes a field winding 66 wound thereabout. Each stator tooth 64 includes an output coil (L1–L5) wound thereabout. The output coils L1–L5 cooperate with a standard full-wave bridge rectifier, not specifically illustrated, to charge the battery. Preferably, the field winding 66 is controlled by a conventional regulator, such as that found in a conventional alternator. As the crank lobe 60 is encounters the teeth 64 of the associated stator branch 62, flux will build and voltage will be induced in the appropriate output coil. When the crank lobe 60 is substantially aligned with a stator tooth 64, the flux will stabilize, reduce, reverse and then decrease to approximately zero as the crank lobe 60 is rotated away from alignment. This process will induce a voltage in the output coil. After the crank lobe 60 leaves the stator tooth 64, the tooth and the associated output coil are at rest, or in a quiescent state, until the crank lobe 60 returns.

Figure 11:
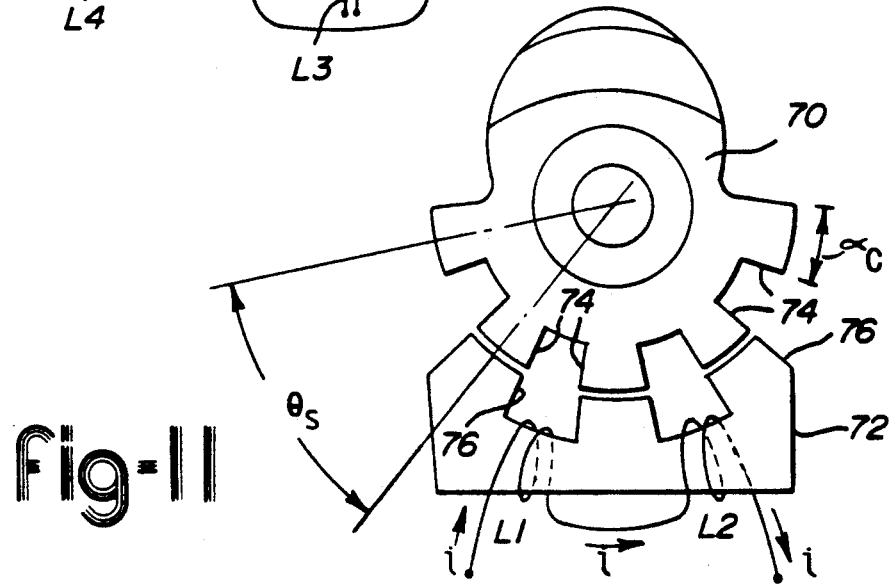
FIG. 11 is a side view of an individual crankshaft lobe and an associated stator branch for a fourth embodiment of the present invention.

Referring now to FIG. 11, there is illustrated yet another preferred embodiment of the present invention. In this preferred embodiment, a crank lobe 70 is rotated past a stator branch 72. As illustrated, the crank lobe 70 is "notched" to include a plurality of crank teeth 74. The stator branch 72 also includes plurality of stator teeth 76. A winding is wound about the stator branch 72 as illustrated to create two coils L1 and L2. The winding is electrically connected to a power stage, such as the power stage 40 shown in FIG. 4. Preferably, the arc length ($\alpha_c$) of the crank teeth 74 is substantially identical to the arc length of the stator teeth 76.

Figure 12:
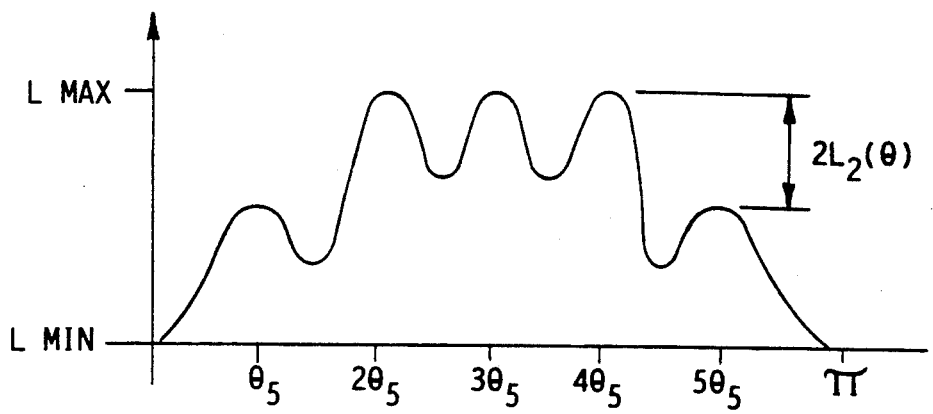
FIG. 12 is a graphical representation of the coil inductance as a function of crank rotation.

With additional reference to FIG. 12, there shown a graphical representation of the coil inductance as the crank lobe 70 is rotated past the stator branch 72. Generally, the ratio of $\alpha_c$ to $\theta_s$ is a design parameter and can be determined to shape the inductance $L_2(\theta)$. The number of cycles is generally equal to the number of crank lobe teeth 74 and the number of crests, or peaks, is generally equal to the number of stator teeth 76. This relationship can be stated mathematically as follows:

$$L(\theta) = L_{MAX}\sin^2(\theta) + L_2\sin(k\theta) \tag{25}$$

where k is number of crank lobe teeth 74.

Recalling that crank torque, T, can be expressed as:

$$T = \frac{1}{2}(i^2)\frac{dL(\theta)}{d\theta} \tag{26}$$

there are k=5 current pulses delivered to the battery during a rotation of a crank lobe 70 over $\pi$ radians.

Figure 13A:
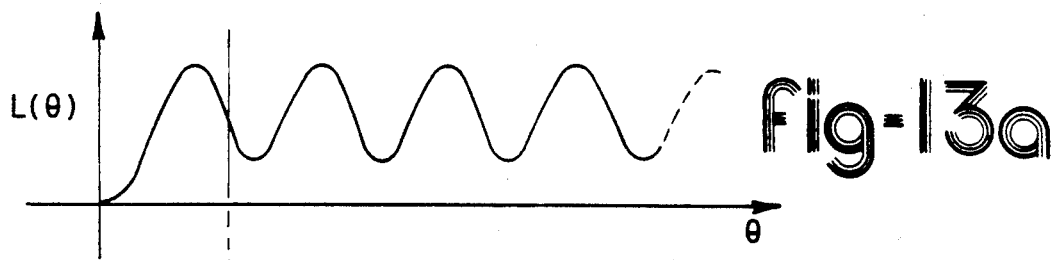
FIGS. 13a and 13b, there are illustrated graphical representations of the inductance (L) and coil current (i) during crank rotation for the embodiment shown in FIG. 11.
Figure 13B:
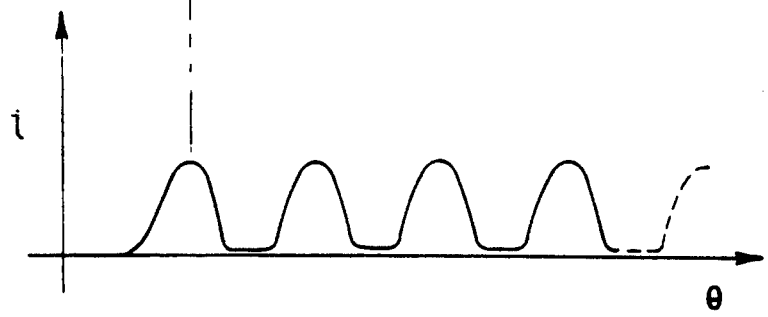

Referring now to FIGS. 13a and 13b, there are illustrated graphical representations of the inductance (L) and coil current (i) during crank rotation for the embodiment shown in FIG. 10. As shown, at the inflection point on each $-dL(\theta)/d\theta$ slope, a pulse of current is generated. By staggering the lobe notches from lobe-to-lobe, phase shifted coil currents can be obtained. Such lobe staggering would require modification of the power stage to allow for proper transistor biasing timing.

Thus, the benefit derived form "notching" the crank lobe is improved energy generation at low engine speeds. Generally, uniformity of battery charging increases with the number of teeth 74 on the crank lobe, which is governed primarily by the ability to wind coils about the teeth. Since "k" inductance changes occur over $\pi$ radians of crankshaft rotation, the effect is similar to an unnotched lobe rotating at a speed of $k\omega_r$, where $\omega_r = \dot{\theta}$.

It is to be understood, of course, that while the forms of the invention described above constitute the preferred embodiments of the invention, the preceding description is not intended to illustrate all possible forms thereof. It is also to be understood that the words used are words of description, rather than limitation, and that various changes may be made without departing from the spirit and scope of the invention, which should be construed according to the following claims.

We claim:

1. An apparatus, for use in a vehicle having an internal combustion engine with a crankcase an a battery, for converting mechanical energy into electrical energy for charging the battery, the apparatus comprising:

a stator disposed within the crankcase of the engine and having at least one tooth having a coil wound thereabout and electrically connected to the battery; and a rotor disposed within the engine crankcase for rotation relative to the stator, the rotor including at least one lobe which moves into proximity with the at least one stator tooth upon rotation of the rotor, thereby inducing a current in the coil for charging the battery.

2. The apparatus of claim 1 wherein the rotor is a crankshaft, the battery being charged during each rotation of the crankshaft.

3. The apparatus of claim 2 wherein a portion of the lobe is laminated with a magnetically conductive material.

4. The apparatus of claim 1 wherein the rotor and the stator tooth are separated by a small air gap when the lobe is proximate the stator tooth.

5. The apparatus of claim 4 wherein the air gap has a range of about 5 mils to about 20 1 mils.

6. The apparatus of claim 5 wherein the air gap has a value of about 15 mils.

7. The apparatus of claim 1 wherein the lobe is formed on the rotor and has an effective arc length of approximately 180°.

8. The apparatus of claim 1 wherein the at least one lobe is notched to form at least one rotor tooth which moves into proximity with the at least one stator tooth upon rotation of the rotor.

9. The apparatus of claim 1 wherein the stator has a field winding wound thereabout.

10. An apparatus, for use in a vehicle having an internal combustion engine with a crankcase and a battery, for converting mechanical energy into electrical energy for charging the battery, the apparatus comprising:

a stator disposed within the crankcase of the engine and having at least one tooth having a coil wound thereabout and electrically connected to the battery;

a rotor disposed within the engine crankcase for rotation relative to the stator, the rotor including at least one pair of lobes which moves into proximity with the at least one stator tooth upon rotation of the rotor, thereby inducing a current in the coil for charging the battery.

11. The apparatus of claim 10 wherein the at least one pair of lobes is formed on the rotor, each individual lobe having an effective arc length of approximately 180°.

12. The apparatus of claim 11 wherein the at least one pair of lobes and the at least one stator tooth are separated by a small air gap when the pair of lobes is proximate the stator tooth.

13. The apparatus of claim 12 wherein the air gap has a range of about 5 mils to about 20 mils.

14. The apparatus of claim 13 wherein the air gap has a value of about 15 mils.

15. The apparatus of claim 10 wherein the at least one lobe is notched to form at least one rotor tooth which moves into proximity with the at least one stator tooth upon rotation of the rotor.

16. The apparatus of claim 10 wherein the stator has a field winding wound thereabout.

17. A method, for use in a vehicle having an internal combustion engine with a crankcase and a battery, of converting mechanical energy into electrical energy for charging the battery, the method comprising the steps of:

rotating a rotor, disposed within the crankcase of the engine, relative to a stator, disposed within the crankcase of the engine, the rotor including at least one lobe, the stator including at least one tooth having a coil wound thereabout and electrically connected to the battery, to bring the lobe proximate to the stator tooth to induce a current in the coil for charging the battery.

18. The method of claim 17 wherein the rotor is a crankshaft.

19. The method of claim 17 wherein the at least one lobe is notched to form at least one rotor tooth.

20. The method of claim 17 wherein the stator has a field winding wound thereabout.

21. The method of claim 17 wherein the rotor includes at least one pair of lobes.

22. A method, for use in a vehicle having an internal combustion engine with a crankcase an a battery, of converting mechanical energy into electrical energy for charging the battery, the method comprising the steps of:

providing a stator, disposed within the crankcase of the engine, the stator including at least one coil wound thereabout and electrically connected to the battery;

providing a crankshaft disposed within the crankcase of the engine for rotation relative to the stator, the crankshaft including at least one lobe; and rotating the crankshaft to bring the lobe proximate to the coil to induce a current in the coil for charging the battery.

23. The method of claim 22 wherein the at least one lobe is notched to form at least one rotor tooth.

24. The method of claim 22 wherein the stator has a field winding wound thereabout.

25. The method of claim 22 wherein the crankshaft has at least one pair of lobes.

* * * * *